United States Patent
Maguire et al.

(10) Patent No.: US 9,892,514 B2
(45) Date of Patent: *Feb. 13, 2018

(54) POST-MANUFACTURE CAMERA CALIBRATION

(71) Applicant: Facebook, Inc., Menlo Park, CA (US)

(72) Inventors: Yael Maguire, Boston, MA (US); Shizhe Shen, San Jose, CA (US)

(73) Assignee: Facebook, Inc., Menlo Park, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/511,579

(22) Filed: Oct. 10, 2014

(65) Prior Publication Data
US 2016/0104284 A1    Apr. 14, 2016

(51) Int. Cl.
| | | |
|---|---|---|
| *H04N 17/00* | (2006.01) | |
| *H04N 17/02* | (2006.01) | |
| *G06T 7/00* | (2017.01) | |
| *H04N 1/00* | (2006.01) | |
| *H04N 5/225* | (2006.01) | |
| *H04N 5/357* | (2011.01) | |
| *G06T 7/80* | (2017.01) | |

(52) U.S. Cl.
CPC .............. *G06T 7/0018* (2013.01); *G06T 7/80* (2017.01); *H04N 1/00* (2013.01); *H04N 5/2257* (2013.01); *H04N 5/3572* (2013.01); *H04N 17/002* (2013.01)

(58) Field of Classification Search
USPC .... 348/180, 187, 188, 189; 455/67.11, 67.7; 382/254, 255, 276, 309
See application file for complete search history.

(56) References Cited

U.S. PATENT DOCUMENTS

| | | |
|---|---|---|
| 6,640,145 B2 | 10/2003 | Hoffberg et al. |
| 6,850,252 B1 | 2/2005 | Hoffberg |
| 6,990,293 B2 | 1/2006 | Hu et al. |
| 7,006,881 B1 | 2/2006 | Hoffberg et al. |
| 7,181,017 B1 | 2/2007 | Nagel et al. |
| 7,436,887 B2 | 10/2008 | Yeredor et al. |
| 7,457,803 B1 | 11/2008 | Robusto et al. |
| 7,587,368 B2 | 9/2009 | Felsher |

(Continued)

OTHER PUBLICATIONS

U.S. Appl. No. 14/311,125 of Toksvig, M., et al., filed Jun. 20, 2014.

(Continued)

*Primary Examiner* — Brian Yenke
*Assistant Examiner* — Omer Khalid
(74) *Attorney, Agent, or Firm* — Perkins Coie LLP

(57) ABSTRACT

Some embodiments include a method of operating a calibration server for a camera module. The method can include: receiving, by the computing server, a first training image taken by the camera module in a mobile device and a corresponding image-context attribute from the mobile device; aggregating, by the computing device, the first training image into a set of contextually similar images based on the image-context attribute; computing a calibration parameter model based on the set of contextually similar images utilizing dimension reduction statistical analysis; and scheduling to update the calibration parameter model to configure an image processor to adjust a raw photograph of the camera module according to the calibration parameter model.

16 Claims, 5 Drawing Sheets

(56) References Cited

U.S. PATENT DOCUMENTS

| | | | |
|---|---|---|---|
| 7,715,644 B2* | 5/2010 | Kochi | H04N 5/217 382/254 |
| 7,762,470 B2 | 7/2010 | Finn | |
| 7,940,685 B1 | 5/2011 | Breslau et al. | |
| 7,966,078 B2 | 6/2011 | Hoffberg et al. | |
| 8,046,313 B2 | 10/2011 | Hoffberg et al. | |
| 8,160,056 B2 | 4/2012 | Van Der Merwe et al. | |
| 8,165,919 B2 | 4/2012 | Moon et al. | |
| 8,194,136 B1* | 6/2012 | Askey | G01M 11/0264 348/175 |
| 8,228,818 B2 | 7/2012 | Chase et al. | |
| 8,401,771 B2 | 3/2013 | Krumm et al. | |
| 8,553,037 B2 | 10/2013 | Smith et al. | |
| 9,412,046 B2 | 8/2016 | Shen et al. | |
| 9,412,164 B2* | 8/2016 | Chang | G06T 7/0018 |
| 2004/0143380 A1* | 7/2004 | Stam | B60Q 1/085 701/36 |
| 2004/0189805 A1* | 9/2004 | Seitz | H04N 5/232 348/188 |
| 2008/0118161 A1* | 5/2008 | Liu | G06K 9/6269 382/228 |
| 2008/0310710 A1* | 12/2008 | Berestov | G06K 9/209 382/162 |
| 2010/0058174 A1* | 3/2010 | Yamamoto | B42F 5/00 715/243 |
| 2010/0183053 A1 | 7/2010 | Tran et al. | |
| 2013/0314549 A1* | 11/2013 | Higuchi | H04N 17/04 348/175 |
| 2015/0134302 A1* | 5/2015 | Chhugani | G06T 19/20 703/1 |
| 2015/0235161 A1 | 8/2015 | Azar | |
| 2016/0104057 A1 | 4/2016 | Shen et al. | |
| 2016/0247044 A1 | 8/2016 | Shen et al. | |

OTHER PUBLICATIONS

U.S. Appl. No. 14/333,353 of Ahki, F., et al., filed Jul. 16, 2014.
U.S. Appl. No. 14/511,597 of Shen, S., et al., filed Oct. 10, 2014.
U.S. Appl. No. 14/534,675 of Yogeeswaran, K., et al., filed Nov. 6, 2014.
U.S. Appl. No. 14/534,690 of Gros, A., et al., filed Nov. 6, 2014.
U.S. Appl. No. 14/534,709 of Yogeeswaran, K., et al., filed Nov. 6, 2014.
Non-Final Office Action dated Oct. 26, 2015, for U.S. Appl. No. 14/511,597 of Shen, S., et al., filed Oct. 14, 2014.
Non-Final Office Action dated Sep. 30, 2015, for U.S. Appl. No. 14/311,125 of Toksvig, M. et al., filed Jun. 20, 2014.
Notice of Allowance dated Mar. 23, 2016, for U.S. Appl. No. 14/511,597 of Shen, S., et al., filed Oct. 14, 2014.
Non-Final Office Action dated Jun. 17, 2016, for U.S. Appl. No. 15/141,714 of Shen, S., et al., filed Apr. 28, 2016.
Notice of Allowance dated Jun. 3, 2016, for U.S. Appl. No. 14/511,597 by Shen, S., et al., filed Oct. 10, 2014.
U.S. Appl. No. 15/141,714 by Shen, S., et al., filed Apr. 28, 2016.
Supplemental Notice of Allowability dated Dec. 21, 2016, for U.S. Appl. No. 15/141,714 of Shen, S., et al., filed Apr. 28, 2016.
Notice of Allowance dated Nov. 14, 2016, for U.S. Appl. No. 15/141,714 of Shen, S., et al., filed Apr. 28, 2016.

* cited by examiner

POST-MANUFACTURE CAMERA CALIBRATION

TECHNICAL FIELD

At least one embodiment of this disclosure relates generally to a camera calibration system and, in particular, to calibrating a low-end camera module.

BACKGROUND

A camera-enabled device (e.g., a digital camera or a camera-enabled phone) includes a camera module comprising a matrix of optical sensors that converts spatial optical information, e.g., luminosity and color values sensed by the optical sensors, into a matrix or an array of digital information. The camera module is the image-capturing component of the camera-enabled device. The camera module may be integrated with control electronics and an output interface to other logic component(s) of the camera-enabled device. The camera module may include an integrated lens system or be compatible with an external lens system. A typical manufacturer of the camera-enabled device may purchase a pre-assembled camera module and/or a lens system from a separate manufacturer.

The camera-enabled device can further include an image processor that transforms the digital information into a digital image. The appearance of digital images produced from this process may depend on the consistency amongst the optical sensors and other optical elements (e.g., the lens system). However, the manufacturing process of the optical sensors and other optical elements oftentimes produces hardware and/or sensitivity differences that may translate to inconsistencies amongst the optical sensors and the optical elements. For example, if a first set of optical sensors is more sensitive to white light than a second set of optical sensors, a digital image of a blanket white canvas produced from these optical sensors may appear rippled or distorted.

Manufacturers of "high-end" camera modules test the optical sensors in their labs and produce a set of calibration parameters corresponding to the matrix of optical sensors. The sensor manufacturers can then store the calibration parameters in a memory module of the camera module. A manufacturer of the camera-enabled device can purchase the camera module and install it in the camera-enabled device. The image processor can then access the memory module of the camera module for the calibration parameters.

During operation of the camera-enabled device, the image processor can read the outputs of the optical sensors from the camera module and adjust the outputs according to the calibration parameters. The calibration parameters may be spatially based on the locations of the optical sensors. These high-end cameras would require additional memory in the camera module to store the calibration parameters.

A digital camera module can be an expensive part of a camera-enabled phone. The testing process to define the calibration parameters is expensive, and the additional memory for the calibration parameters is also expensive. However, if the manufacturers of the camera module forego the testing process and the additional memory, the images produced from its camera module may then be inconsistent or distorted due to lack of calibration. Thus, images captured by these "low-end" camera modules can be quite inferior as compared to high-end camera modules.

Figure 1:
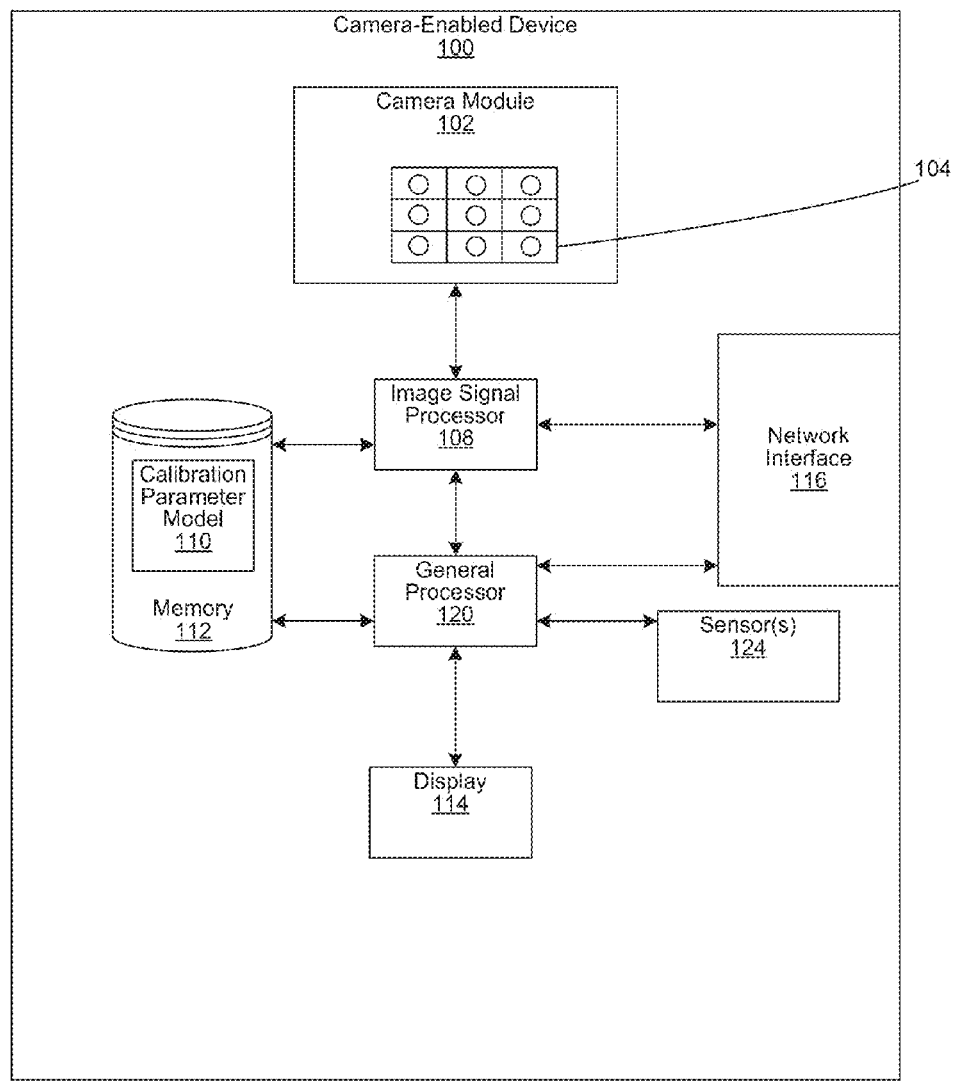
FIG. 1 is a block diagram of a camera-enabled device, in accordance with various embodiments.

The figures depict various embodiments of this disclosure for purposes of illustration only. One skilled in the art will readily recognize that alternative embodiments of the structures and methods illustrated herein may be employed without departing from the principles of the invention described herein.

DETAILED DESCRIPTION

In some embodiments, a camera calibration process is disclosed. A camera-enabled device may require calibration due to variations in the optics and sensors (e.g., variations of sensor color filter array (CFA), infrared cut filter (IRCF) coating, lens coating, etc.) used by the camera-enabled device. The camera-enabled device is a mobile device. Typically, in the manufacturing process of a high-end camera or a high-end mobile device with a camera, detailed testing is performed to configure one or more register tables sold with a camera module (e.g., including the optical sensors) to optimize shading, white balance, de-noise, or other adjustments. In this disclosure, camera module refers to at least the sensors and control circuitry associated therewith. The camera-enabled device refers to an apparatus that utilizes the camera module, including for example, a smartphone, a tablet, a wearable device, an e-reader or any combination thereof.

Performing this testing adds to the cost of the camera-enabled devices. To decrease the cost of a camera-enabled smartphone, for example, a phone manufacture can opt to purpose cheaper camera modules that are not calibrated in the production stage. The disclosed process improves upon this testing stage by computing over time, e.g., at a cloud computing server, sensor output adjustments based on sample photographs taken by camera-enabled devices. In some embodiments, the sample photographs are pre-processed into low spatial frequency images to save on bandwidth between the cloud computing server and the camera-enabled device. In some embodiments, where the calibration benefits from a full-spectrum of a photograph, such as de-noising calibration, a sample photograph is pre-processed into a fragment of the photograph representing noise-space so that an adequate filter/transform can be applied to compute a calibration parameter model.

For each image transmitted to the cloud computing server, the camera-enabled device can also transmit to the cloud computing server context data related to the image (e.g., statistical information for ambient luminance, focus location, geographical location, camera orientation or other inertial sensor data reading on the camera-enabled device, etc.). The cloud computing server can compute the sensor output adjustments based on statistical analysis and/or machine learning, including for example, dimension reduction techniques (e.g., principal component analysis (PCA) or multivariate regression). The sensor output adjustment parameters can be fed back to an image processor operating at the camera-enabled device and/or be used to automatically adjust images at the cloud computing server. The cloud computing server can propagate adjustment parameters to the camera-enabled device from which the images are received and/or to other devices that use a similar camera component. Thus, various embodiments enable digital images captured using a low-end camera and shared (e.g., on an online social network) to be significantly improved as compared to the originally captured image. In various embodiments, because the sensor output adjustment parameters can be varied over time, e.g., to suit individual or population preferences, the shared images can even be superior to those generated by high-end cameras. For example, the adjustment parameters can be varied to suit color preferences of users (e.g., a particular user may prefer a slightly color neutral image as compared to a different user who prefers vivid colors), groups of users (e.g., users in Japan may prefer cooler colors as compared to users in the United States), etc. The adjustment parameters can be used to tune an image to virtually any adjustment that can be made to an image during capture or "post-processing" in addition to color, e.g., luminosity/brightness, contrast, sharpness, noise reduction, graininess, white balance, etc.

FIG. 1 is a block diagram of a camera-enabled device 100, in accordance with various embodiments. The camera-enabled device 100, for example, includes a camera module 102. In some embodiments, the camera-enabled device 100 can have multiple camera modules. In some embodiments, the camera module 102 is not factory calibrated. The camera module 102 can include one or more optical sensors 104. In some cases, the optical sensors 104 are aligned in a matrix formation, each corresponding to at least a two-dimensional coordinate. The camera module 102 can have multiple color channels. For example, at the same location (e.g., the same two-dimensional coordinate), there may be multiple optical sensors corresponding to the multiple color channels. In another example, each of the optical sensors 104 may include subcomponents, each corresponding to a color channel (e.g., Bayer pattern).

The camera module 102 may be coupled to an image signal processor 108. The image signal processor 108 can be a general-purpose processor configured with executable instructions to process digital images. Alternatively, the image signal processor 108 may be special-purpose circuitry adapted to process images (e.g., images captured by the camera module 102).

In some embodiments, the image signal processor 108 can process raw photographs taken by the camera module 102 based on a calibration parameter model 110 before the processed images are saved into a memory 112 of the camera-enabled device 100 or presented on a display 114. For example, the calibration parameter model 110 can define adjustments in white balancing and lens shading to the raw photographs. In some embodiments, the calibration parameter model 110 can also be saved in the memory 112. In various embodiments, a raw photograph is a file encoding data received directly from the camera module 102, e.g., prior to any image manipulation or other processing.

In some embodiments, the calibration parameter model 110 is calculated externally by a calibration server. In those embodiments, the camera-enabled device 100 can download the calibration parameter model 110 via a network interface 116. The network interface 116 enables communication with external electronic devices. For example, the network interface 116 can provide wireless communication, e.g., Wi-Fi, Wi-Fi direct, Bluetooth, cellular network (e.g., EDGE, 2G, 3G, 4G, LTE, etc.). In other embodiments, the calibration server can be implemented as part of the camera-enabled device 100.

In some embodiments, to facilitate the calibration server to compute the calibration parameter model 110, the camera-enabled device 100 provides a threshold number of training images to the calibration server over time, where the threshold number is determined to be sufficient to compute/derive the calibration parameter model 100. For example, the threshold number can be indicated by the calibration server via a message or be a pre-determined parameter in the camera-enabled device 100. These training images can be delivered via the network interface 116. In some embodiments, the training images may be low spatial frequency images of raw photographs taken by the camera module 102. In some embodiments, the camera-enabled device 100 can request the calibration server to return the calibration parameter model 110 regardless of whether the threshold number of training images have been received at the calibration server. In some embodiments, the calibration parameter model 110 is updated iteratively and continuously.

When providing a training image to the calibration server, the image signal processor 108 or a general processor 120 can sample or average sensor readings from the camera module within nearby coordinates of a raw photograph to produce a low spatial frequency image as the training image. The low spatial frequency image is then provided to the network interface 116 for uploading to the calibration server.

Also when uploading a training image to the calibration server, the image signal processor 108 or the general processor 120 can provide an image-context attribute associated with the training image (e.g., the raw photograph or the low spatial frequency image) to the calibration server. The image-context attribute, for example, can be a camera module configuration (e.g., exposure, focus distance, aperture size, zoom, or shutter speed), an image analysis context (e.g., statistical information of luminance and focus location estimation), a camera operation context (e.g., camera orientation, or degree of handshaking), or an environment context (e.g., ambient luminance, ambient temperature, ambient noise, time of day, or a geo-tag). In some embodiments, the image signal processor 108 or the general processor 120 can provide multiple image-context attributes associated with the training image to the calibration server. At least some of these image-context attributes can be computed based on image analysis of the training images and/or sensor data captured at the time the raw photographs corresponding to the training images are taken. The image-context attributes can, for example, be based on sensor data from one or more sensors 124. The sensors 124, for example, can include microphones, ambient light sensors, temperature sensors, motion sensors, orientation sensors, inertia sensors, location sensors (e.g., global positioning system (GPS) or cellular antennas used for triangulation), or any combination thereof.

Figure 2:
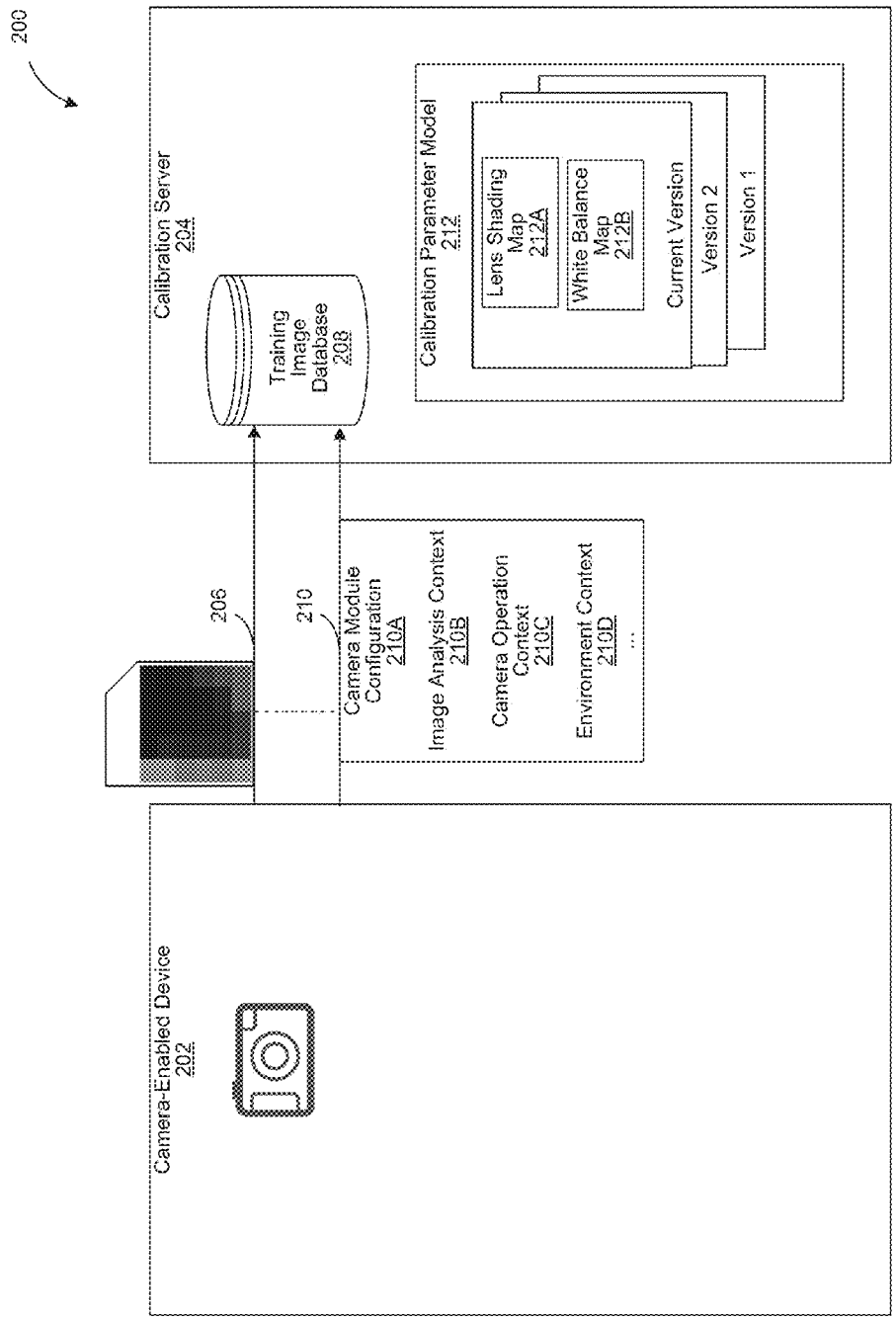
FIG. 2 is a control flow diagram of a camera calibration system, in accordance with various embodiments.

FIG. 2 is a control flow diagram of a camera calibration system 200, in accordance with various embodiments. The camera calibration system 200 can include a camera-enabled device 202 and a calibration server 204. The camera-enabled device 202 can be the camera-enabled device 100 of FIG. 1. The calibration server 204 can be implemented with one or more computing devices. The calibration server 204, for example, can be a personal computer, a computer server, a cloud computing device, a virtualized operating system, a distributed computing cluster, a mobile device, a field programmable gate array (FPGA), an application-specific integrated circuitry (ASIC), or any combination thereof.

The camera calibration system 200 is implemented by having the camera-enabled device 202 share one or more training images 206 (e.g., non-calibrated images) to the calibration server 204. In some embodiments, the calibration server 204 can aggregate the training images 206 in a training image database 208 until there is a statistically significant amount of images to produce an accurate calibration parameter model. The training image database 208 may be implemented by one or more volatile and/or non-volatile memory devices controlled by a database manager.

In some embodiments, the camera-enabled device 202 can request its user (e.g., via a message shown on the display 114 of FIG. 1) to take photographs at particular background or lighting conditions. For example, the camera-enabled device 202 can request the user to take photographs at a white background, other uniform background, no light condition, sunlight condition, incandescent light condition, halogen light condition, or any combination thereof. For another example, the camera-enabled device 202 can request, via a display interface, the user to take a set of pictures from a calibrated phone (e.g., entry-level or high-end factory calibrated phone). For example, the camera calibration system 200 can utilize the calibrated pictures for comparison to make the calibration model computation more efficient. In those embodiments, the camera-enabled device 202 can generate training images based on these photographs to share with the calibration server 204. The camera-enabled device 202 can also share identifiers of the associated background condition or lighting condition with the training images.

In some embodiments, as the camera-enabled device 202 uploads a training image, the camera-enabled device 202 also provides one or more image-context attributes 210 (e.g., a camera module configuration 210A, an image analysis context 210B, a camera operation context 210C, and/or an environment context 210D, collectively as the "image-context attributes 210") to the calibration server 204. The camera module configuration 210A indicates one or more parameters used to configure the camera module of the camera-enabled device 202 when the training image is taken. The image analysis context 210B indicates one or more attributes of the training image determined through image analysis by an image signal processor of the camera-enabled device 202. In some embodiments, the calibration server 204 can derive the image analysis context 210B on its own. The camera-operation context 210C indicates one or more user operational behaviors as observed by sensors (e.g., an accelerometer, a gyroscope, or other inertial sensor or motion sensor) in the camera-enabled device 202. The environment context 210D indicates information regarding the ambient environment that the camera-enabled device 202 is in when the training image is taken. For example, this can be location information, weather information, solar exposure information, time-of-day or day of year information, shading information, temperature information or any combination thereof. This information can be derived from a geo-tag (from a global positioning system (GPS) of the camera-enabled device 202 or via cellular triangulation) or a timestamp tracked by the camera-enabled device 202. The environment context 210D can also include the lighting condition or the background condition discussed above associated with the training images.

In some embodiments, the calibration server 204 can request input of at least one of the image-context attributes 210 from a user. At least a portion of the image-context attributes 210 can be sent over from the image signal processor of the camera-enabled device 202 via a network interface (e.g., the network interface 116 of FIG. 1). At least a portion of the image-context attributes 210 can be sent over from the general processor of the camera-enabled device 202 via a network interface. The image-context attributes 210 can also be saved in the training image database 208.

When there is sufficient number of training images 206 in the training image database 208 (e.g., the calibration server 204 can check periodically to see if a threshold is met or test for sufficiency based on a criterion), the calibration server 204 can compute a calibration parameter model 212 based on a set of training images. The set of training images may be selected based on contextual similarities. The calibration server 204 can identify contextual similarities between training images by accessing the image-context attributes 210 stored in the training image database 208.

The calibration server 204 can compute the calibration parameter model 212 by performing machine learning and/or statistical analysis, e.g., a dimension reduction analysis. For example, the machine learning may be based on a Gaussian mixture model or a support vector machine (SVM). For example, the dimension reduction analysis can be principal component analysis (PCA), regression analysis, partial least squares analysis, exploratory factor analysis, independent component analysis (ICA), canonical correlation analysis (CCA), multivariate regression, Fisher's Linear Discriminant (FLD), linear discriminative analysis (LDA), non-negative matrix factorization (NMF), kernel methods for nonlinear extension, or any combination thereof. The machine learning and/or the statistical analysis enable the calibration server 204 to identify one or more features that distorts photographs from the same camera module in the same way. These features can correspond to visual effects due to variations in the optical elements (e.g., sensors or lens) of the camera module that a calibration process intends to remove.

In some embodiments, the calibration server 204 can perform the machine learning/statistical analysis on contextually similar training images to compute a lens shading map 212A particular to the camera module in the camera-enabled device 202. Similarly, the calibration server 204 can perform the machine learning/statistical analysis on contextually similar training images to compute a white balance map 212B particular to the camera module in the camera-enabled device 202. In some embodiments, the calibration server 204 can identify other visual anomalies in the camera module. In some embodiments, the same concept described for the calibration of a camera module can be applied to the calibration of other sensor or sensor arrays (e.g., microphone or microphone array, infrared sensor or infrared sensor array) in a mobile device.

Once the calibration server 204 finishes performing the machine learning/statistical analysis, the calibration server 204 can save the result(s) (e.g., the white balance map 212B or the lens shading map 212A) as part of the calibration parameter model 212. In some embodiments, the calibration parameter model 212 can be used by the calibration server 204 to post-process photographs taken by the camera-enabled device 202. In some embodiments, the calibration server 204 can send the calibration parameter model 212 to the camera-enabled device 202. Then a processor of the camera-enabled device 202 post-processes raw photographs taken by its camera module to correct those images based on the calibration parameter model 212. In some embodiments, the calibration server 204 can send the calibration parameter model 212 to an external server that has access to photographs taken by the camera module of the camera-enabled device 202. The external server can then post-process the photographs according to the calibration parameter model 212.

Figure 3:
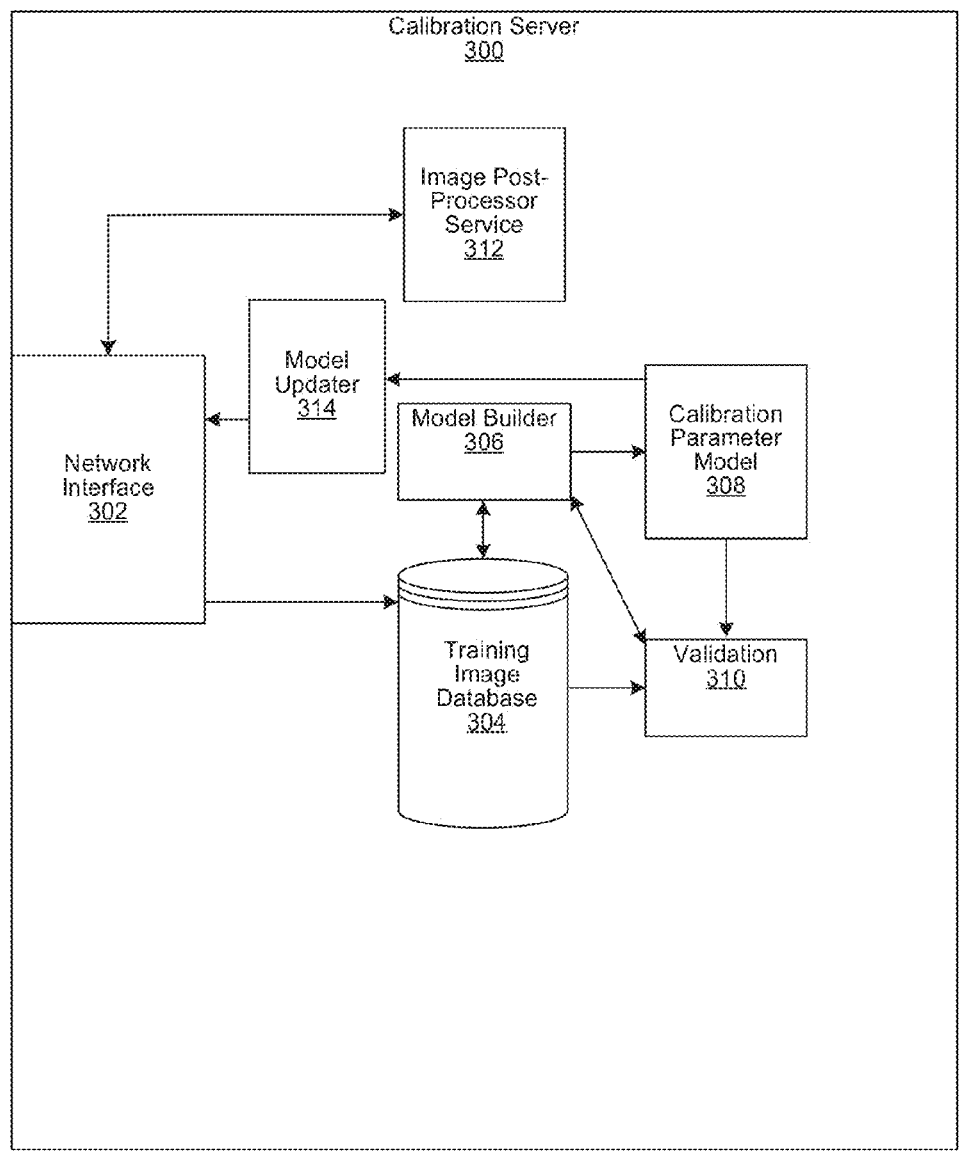
FIG. 3 is a functional block diagram of a calibration server, in accordance with various embodiments.

FIG. 3 is a functional block diagram of a calibration server 300, in accordance with various embodiments. The calibration server 300 can include a network interface 302 that can send and/or receive messages from one or more mobile devices, e.g., the camera-enabled device 100 of FIG. 1. The calibration server 300 can maintain a training image database 304 (e.g., the training image database 208 of FIG. 2). The calibration server 300 can receive training images overtime from a camera-enabled device (e.g., the camera-enabled device 100 of FIG. 1) via the network interface 302 to be stored in the training image database 304.

The calibration server 300 can include a model builder module 306 that generates a calibration parameter model 308. The model builder module 306 can generate the calibration parameter model 308 based on at least a subset of the training images in the training image database 304. The model builder module 306 can select the subset based on contextual similarities. The model builder module 306 can perform statistical analysis or machine learning to identify defects or variations in the optical elements of the camera module responsible for visual effects in the training images. The identified defects or variations can then be used to create a spatial map that indicates how to adjust an image to normalize out parts of the image effected by the defects or variations.

In some embodiments, the training images may include related images taken by one or more foreign camera modules other than the camera module that the calibration parameter model 308 is intended for. For example, the related images may include images generated based on photographs taken by the foreign camera modules having the same camera module model. For another example, the related images may include images generated based on photographs taken by the foreign camera modules with the same type of lenses, sensors, or other optical elements. The related images from multiple camera modules may be used to normalize the variations/differences between individual modules of the same lens design or sensor model. The related images may also be used to compute statistical information from a large population of modules to predict an initial calibration parameter model or set a boundary for optimization of the calibration parameter model.

Optionally, the calibration server 300 can include a validation module 310 that processes at least a portion of the training images according to a current version of the calibration parameter model 308 to determine whether effective corrections are being made. Statistical analysis can be used to determine whether the calibration parameter model 308 has successfully removed parts of an image that are effected by variations of the optical component of the camera module that the calibration parameter model 308 is associated with. The portion of training images used for validation can overlap with or be separate from training images used to build the calibration parameter model 308. The validation module 310 can process a sample set of images using the calibration parameter model 308. The validation module 310 can then use one or more image quality metrics to validate that the calibration parameter model 308 is working accurately and/or consistently. In some cases, the validation module 310 may request the users to take picture under specific conditions through a feedback mechanism to the camera-enabled device. In some embodiments, the validation module 310 can be implemented in the camera-enabled device.

In some embodiments, the calibration server 300 can include an image post-processor service module 312. The image post-processor service module 312 provides a web-accessible service via the network interface 302. The web-accessible service (e.g., as an application programming interface (API) or a website) allows a camera-enabled device to upload photographs to the calibration server 300 to be calibrated. If the calibration server 300 contains a calibration parameter model associated with that camera-enabled device, then the image post-processor service module 312 calibrates the uploaded photographs utilizing the associated calibration parameter model.

In some embodiments, the calibration server 300 can include a model updater module 314. The model updater module 314 can provide the calibration parameter model to its associated camera-enabled device. This mechanism enables the camera-enabled device to function as if it has a pre-calibrated camera module even if its camera module is not factory calibrated. Unlike using the image post-processor service module 312, the camera-enabled device can use a calibration parameter model even without a network connection.

Portions of active components, modules, and databases (e.g., hardware-based, firmware-based, software-based, or other configurable and functional modules) associated with the calibration server 300 and/or the camera calibration system 200 may be implemented in the form of special-purpose circuitry, in the form of one or more appropriately programmed processors, a single board chip, a field programmable gate array, a network-capable computing device, a virtual machine, a cloud-based terminal, or any combination thereof. For example, the components described can be implemented as instructions on a tangible storage memory capable of being executed by a processor or other integrated circuit chip. The tangible storage memory may be volatile or non-volatile memory. In some embodiments, the volatile memory may be considered "non-transitory" in the sense that it is not a transitory signal. Memory space and storages described in the figures can be implemented with the tangible storage memory as well, including volatile or non-volatile memory.

Each of the components may operate individually and independently of other components. Some or all of the components may be executed on the same host device or on separate devices. The separate devices can be coupled through one or more communication channels (e.g., wireless or wired channel) to coordinate their operations. Some or all of the components may be combined as one component. A single component may be divided into sub-components, each sub-component performing separate method step or method steps of the single component.

In some embodiments, at least some of the components share access to a memory space. For example, one component may access data accessed by or transformed by another component. The components may be considered "coupled" to one another if they share a physical connection or a virtual connection, directly or indirectly, allowing data accessed or modified by one component to be accessed in another component. In some embodiments, at least some of the components can be upgraded or modified remotely (e.g., by reconfiguring executable instructions that implements a portion of the components). The camera calibration system 200 may include additional, fewer, or different components for various applications.

Figure 4:
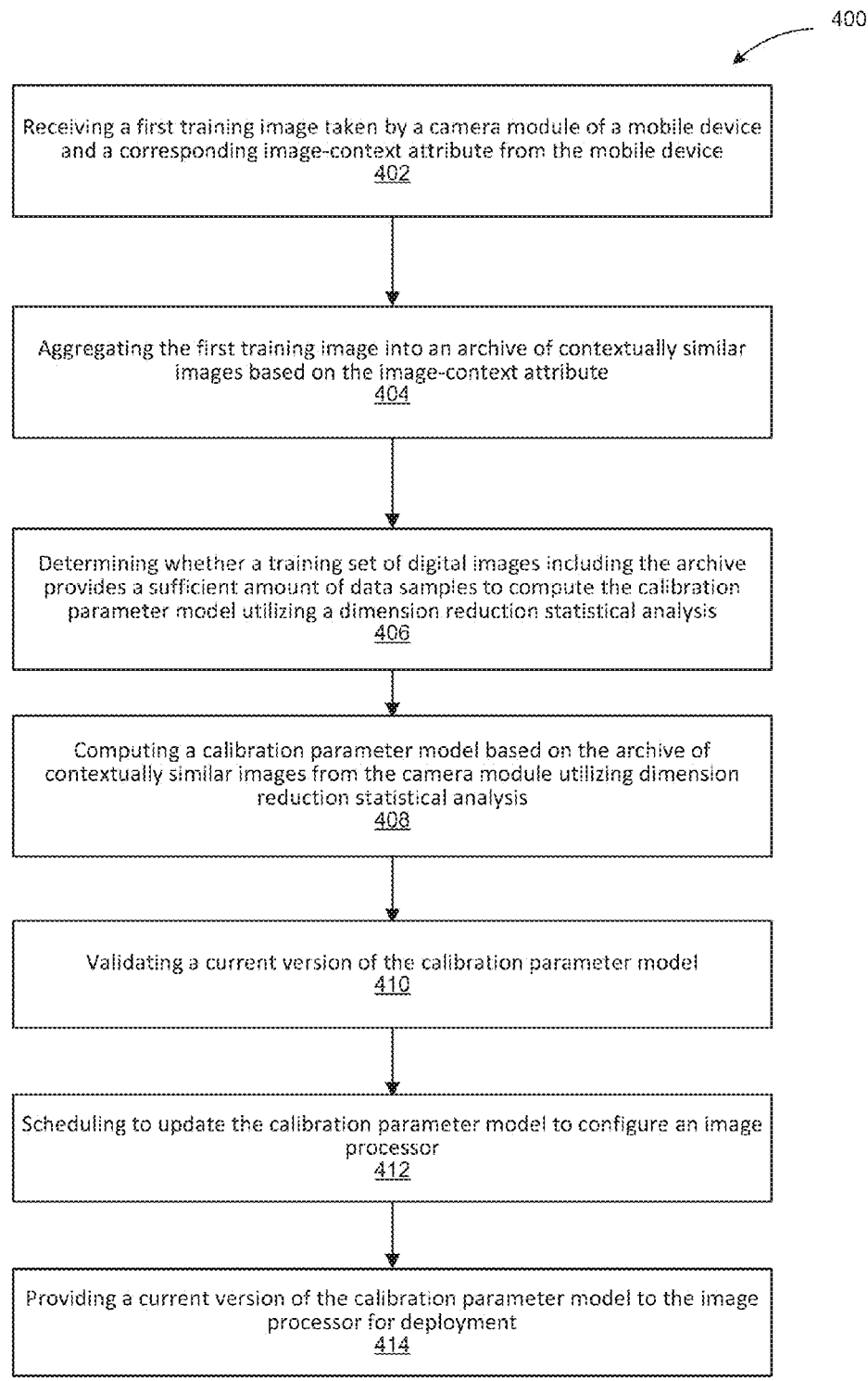
FIG. 4 is a flowchart of a method of operating a computing device to calibrate a camera module after deployment, in accordance with various embodiments.

FIG. 4 is a flowchart of a method 400 of operating a computing device (e.g., the calibration server 300 of FIG. 3) to calibrate a camera module after deployment, in accordance with various embodiments. The method 400 includes step 402 where the computing device receives a first training image taken by a camera module of a mobile device and a corresponding image-context attribute from the mobile device. In some embodiments, the computing device is separate from the mobile device. In some embodiments, the computing device is part of the mobile device. In some embodiments, the first training image is a low-spatial frequency image. A low spatial frequency image can identify the variations of optical elements of the camera module while reducing the bandwidth required to send the training images to the computing device. The low-spatial frequency image can be produced by averaging nearby pixels and/or by sampling one or more color values in pixel clusters to represent pixels in the pixel clusters. At step 404, the computing device can aggregate the first training image into a set of contextually similar images based on the image-context attribute.

Optionally, at step 406, the computing device can determine whether a training set of digital images including the set provides a sufficient amount of data samples to compute the calibration parameter model utilizing a dimension reduction statistical analysis. Then, at step 408, the computing device computes a calibration parameter model based on the set of contextually similar images from the camera module utilizing the dimension reduction statistical analysis. The calibration parameter model may be designated as being associated with the camera module. For example, the calibration parameter module can be specific to the specific camera module. For another example, the calibration parameter module can be specific to a model of the camera module (e.g., the calibration parameter module can be used with other camera modules with the same model).

The calibration parameter model can include a shading correction matrix (e.g., the lens shading map 212A of FIG. 2), a white balance correction matrix (e.g., the white balance map 212B of FIG. 2), a color correction matrix, noise characteristics for denoise, or any combination thereof. In some embodiments, the computing device computes the calibration parameter model based on training images from multiple camera modules associated with a specific design specification, model or type of camera module.

In some embodiments, the computing device receives multiple image-context attributes associated with the first training image at step 402. In those embodiments, the computing device can collect the first training image into one or more sets of contextually similar images, each of the sets corresponding to at least one of the multiple image-context attributes. The computing device can compute the calibration parameter model by at least reducing differences between raw photographs from the sets of the multiple image-context attributes by normalizing out visual effects of the multiple image-context attributes.

In some embodiments, step 408 is in response to determining that the training set does provide the sufficient amount at step 406. In some embodiments, step 408 is in response to receiving the first training image. In some embodiments, step 408 is executed according to a preset schedule. In some embodiments, step 408 can be executed as an iterative process. As more training images are aggregated into the set, the computing device can iteratively update the calibration parameter model.

Optionally at step 410, the computing device can validate a current version of the calibration parameter model by adjusting a test image based on the current version to determine whether the calibration parameter model has improved in accuracy or image quality measured by objective image quality metrics over a previous version of the calibration parameter.

The computing device can cause an image processor to calibrate subsequently captured raw photographs and/or existing, saved raw photographs, for example, by providing the calibration parameter model to the image processor. The image processor can be in the computing device or another computing device. In the case that the image processor is already configured with a version of the calibration parameter model, the computing device can update the image processor with a different version. All or a subset of these updates can be approved or rejected by one or more users through a user interface in the camera-enabled device or on a web-based interface associated with the computing device (e.g., the calibration server).

For example, at step 412, the computing device can schedule to update the calibration parameter model to configure an image processor. Step 412 may be in response to determining that the current version of the calibration parameter model has improved in accuracy or image quality. By updating the calibration parameter model to the image processor, the image processor is able to remove visual effects in a raw photograph taken by the camera module utilizing the calibration parameter model. The scheduling may be in accordance with a periodic cycle.

According to the scheduling of step 412, the computing device can provide a current version of the calibration parameter model to the image processor for deployment at step 414. Once deployed, the image processor can utilize the calibration parameter model to adjust subsequent photographs taken by the camera module to remove the visual effects caused by variations of the optical elements and/or sensors in the camera module. In some embodiments, as the calibration parameter model is iteratively updated, the image processor can iteratively update existing saved photographs, e.g., including previously calibrated images.

In some embodiments, the image processor is part of the mobile device. In these embodiments, the image processor can be configured to process the raw photographs taken by the camera module according to the calibration parameter model prior to saving or displaying the raw photographs on the mobile device.

In some embodiments, the image processor is part of the computing device. In these embodiments, the computing device is configured as an online storage of raw photographs taken by the camera module of the mobile device. The image processor can be configured to adjust (e.g., automatically or in response to user request) the raw photographs in the online storage and subsequently uploaded photographs according to the calibration parameter model. In some embodiments, the image processor is part of an external sever for photo processing. The external server can be separate from the computing device and the mobile device. The external server can receive the raw photograph taken by the camera module from the mobile device and then process the raw photograph based on the calibration parameter model to present in a network-accessible interface (e.g., to a user of the mobile device).

While processes or methods are presented in a given order, alternative embodiments may perform routines with steps or employ systems with blocks in a different order, and some processes or blocks may be deleted, moved, added, subdivided, combined, and/or modified to provide alternative or subcombinations. Each of these processes or blocks may be implemented in a variety of different ways. In addition, while processes or blocks are at times shown as being performed in series, these processes or blocks may instead be performed in parallel or may be performed at different times.

Figure 5:
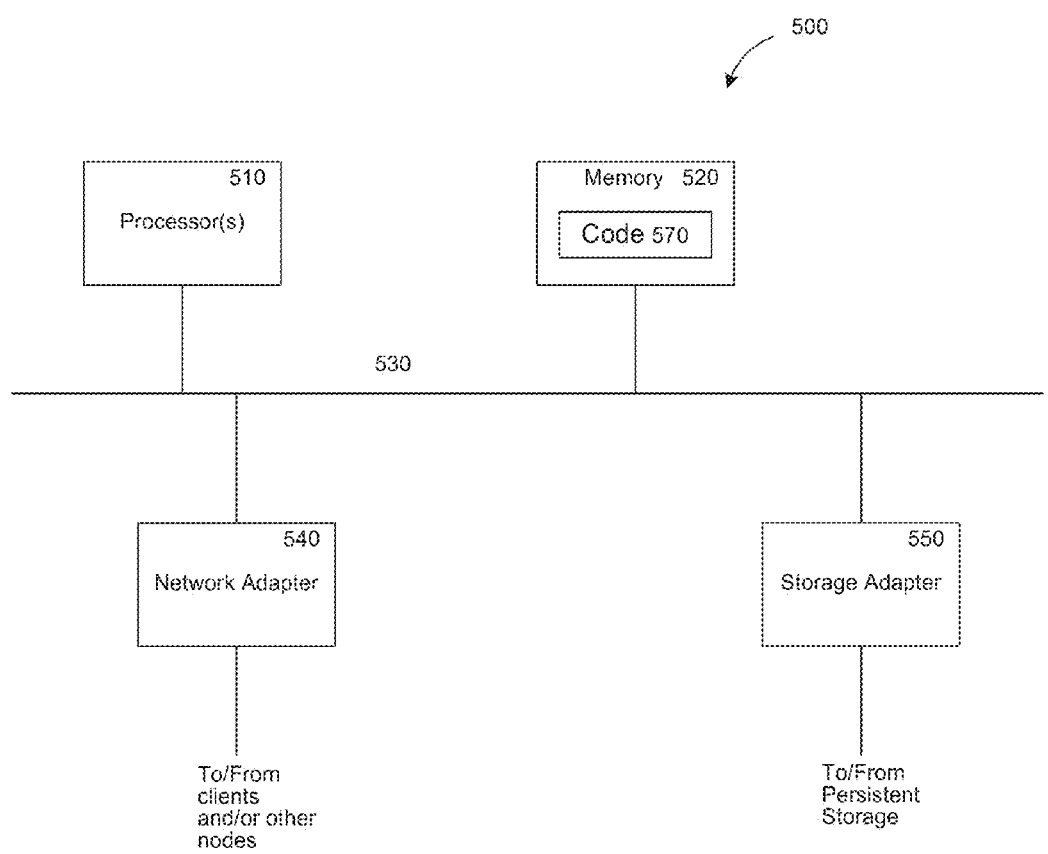
FIG. 5 is a block diagram of an example of a computing device, which may represent one or more computing devices or servers described herein, in accordance with various embodiments.

FIG. 5 is a block diagram of an example of a computing device 500, which may represent one or more computing devices or servers described herein, in accordance with various embodiments. The computing device 500 can be one or more computing devices that implement the calibration server 300 of FIG. 3 or methods and processes described in this disclosure (e.g., the method 400 of FIG. 4). The computing device 500 includes one or more processors 510 and memory 520 coupled to an interconnect 530. The interconnect 530 shown in FIG. 5 is an abstraction that represents any one or more separate physical buses, point-to-point connections, or both connected by appropriate bridges, adapters or controllers. Therefore, the interconnect 530 may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1594 bus, also called "Firewire."

The processor(s) 510 is/are the central processing unit (CPU) of the computing device 500 and thus controls the overall operation of the computing device 500. In certain embodiments, the processor(s) 510 accomplishes this by executing software or firmware stored in memory 520. The processor(s) 510 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 520 is or includes the main memory of the computing device 500. The memory 520 represents any form of random access memory (RAM), read-only memory (ROM), flash memory, or the like, or a combination of such devices. In use, the memory 520 may contain a code 570 containing instructions according to the mesh connection system disclosed herein.

Also connected to the processor(s) 510 through the interconnect 530 are a network adapter 540 and a storage adapter 550. The network adapter 540 provides the computing device 500 with the ability to communicate with remote devices, over a network and may be, for example, an Ethernet adapter or Fibre Channel adapter. The network adapter 540 may also provide the computing device 500 with the ability to communicate with other computers. The storage adapter 550 enables the computing device 500 to access a persistent storage, and may be, for example, a Fibre Channel adapter or SCSI adapter.

The code 570 stored in memory 520 may be implemented as software and/or firmware to program the processor(s) 510 to carry out actions described above. In certain embodiments, such software or firmware may be initially provided to the computing device 500 by downloading it from a remote system through the computing device 500 (e.g., via network adapter 540).

The techniques introduced herein can be implemented by, for example, programmable circuitry (e.g., one or more microprocessors) programmed with software and/or firmware, or entirely in special-purpose hardwired circuitry, or in a combination of such forms. Special-purpose hardwired circuitry may be in the form of, for example, one or more application-specific integrated circuits (ASICs), programmable logic devices (PLDs), field-programmable gate arrays (FPGAs), etc.

Software or firmware for use in implementing the techniques introduced here may be stored on a machine-readable storage medium and may be executed by one or more general-purpose or special-purpose programmable microprocessors. A "machine-readable storage medium," as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible storage medium includes recordable/non-recordable media (e.g., read-only memory (ROM); random access memory (RAM); magnetic disk storage media; optical storage media; flash memory devices; etc.), etc.

The term "logic," as used herein, can include, for example, programmable circuitry programmed with specific software and/or firmware, special-purpose hardwired circuitry or a combination thereof.

Some embodiments of the disclosure have other aspects, elements, features and steps in addition to or in place of what is described above. These potential additions and replacements are described throughout the rest of the specification.

What is claimed is:

1. A computer-implemented method comprising:
receiving, at a computer server system from a mobile device, a first training image taken by a camera module of the mobile device and an image-context attribute describing a context associated with the first training image, wherein the image-context attribute is separate from the first training image;
adding, by the computer server system, the first training image into a sub-group of training images in accordance with a similarity based, at least in part, on the image-context attribute;
in response to determining that a training set of images including the sub-group provides a threshold amount of data samples to compute a calibration parameter model, computing, by the computer server system, the calibration parameter model based, at least in part, on the sub-group of training images utilizing dimension reduction statistical analysis, wherein the calibration parameter model configures at least an image adjustment process corresponding to the image-context attribute and wherein the image adjustment process is configured to define how to post-process a raw photograph after being captured by the camera module; and
causing, by the computer server system, an image processor to calibrate the raw photograph of the camera module by providing the calibration parameter model to the image processor.

2. The computer-implemented method of claim 1, further comprising providing a current version of the calibration parameter model to the image processor for deployment; and wherein the image processor is part of the mobile device; and wherein the image processor is configured to process raw photographs taken by the camera module prior to saving or displaying the raw photographs.

3. The computer-implemented method of claim 1, wherein the image processor is part of the computer server system that performs said computing of the calibration parameter model; wherein the computing server system is configured as an online storage of raw photographs taken by the camera module of the mobile device; and wherein the image processor is configured to adjust automatically the raw photographs in the online storage and subsequently uploaded photographs according to the calibration parameter model.

4. The computer-implemented method of claim 1, wherein the image processor is part of an external server separate from the computer server system and the mobile device; and further comprising:
receiving, at the external server, the raw photograph taken by the camera module from the mobile device; and
processing, by the external server, the raw photograph based on the calibration parameter model to present in a network accessible interface.

5. The computer-implemented method of claim 1, wherein computing the calibration parameter model is in response to receiving the first training image.

6. The computer-implemented method of claim 1, wherein computing the calibration parameter model is according to a preset schedule.

7. The computer-implemented method of claim 1, further comprising:
adjusting a test image based on a current version of the calibration parameter model to determine whether the calibration parameter model has improved in accuracy over a previous version of the calibration parameter; and
wherein providing the calibration parameter model for the image processor is in response to determining that the current version has improved in accuracy.

8. The computer-implemented method of claim 1, wherein the first training image is a low spatial frequency image.

9. A non-transitory computer-readable data storage medium storing computer-executable instructions that, when executed, cause a computer system to perform a computer-implemented method, the computer-executable instructions comprising:
instructions for receiving, at a computer server system from a mobile device, a first training image taken by a camera module of the mobile device and an image-context attribute describing a context associated with the first training image, wherein the image-context attribute is separate from the first training image;
instructions for adding, by a computer server system, the first training image into a sub-group of training images in accordance with a similarity based, at least in part, on the image-context attribute;
instructions for in response to determining that a training set of images including the sub-group provides a threshold amount of data samples to compute a calibration parameter model, computing, by the computer server system, the calibration parameter model based, at least in part, on the subgroup of training images utilizing dimension reduction statistical analysis, wherein the calibration parameter model configures at least an image adjustment process corresponding to the image-context attribute and wherein the image adjustment process is configured to define how to post-process a raw photograph after being captured by the camera module; and
instructions for causing, by a computer server system, an image processor to calibrate the raw photograph of the camera module by providing the calibration parameter model to the image processor.

10. The non-transitory computer-readable data storage medium of claim 9, wherein the computer-executable instructions further comprises instructions for providing a current version of the calibration parameter model to the image processor for deployment; and wherein the image processor is part of the mobile device; and wherein the image processor is configured to process raw photographs taken by the camera module prior to saving or displaying the raw photographs.

11. The non-transitory computer-readable data storage medium of claim 9, wherein the image processor is part of the computer server system that performs said computing of the calibration parameter model; wherein the computing server system is configured as an online storage of raw photographs taken by the camera module of the mobile device; and wherein the image processor is configured to adjust automatically the raw photographs in the online storage and subsequently uploaded photographs according to the calibration parameter model.

12. The non-transitory computer-readable data storage medium of claim 9, wherein the image processor is part of an external server separate from the computer server system and the mobile device; and wherein the computer-executable instructions further comprises:
instructions for receiving, at the external server, the raw photograph taken by the camera module from the mobile device; and
instructions for processing, by the external server, the raw photograph based on the calibration parameter model to present in a network accessible interface.

13. The non-transitory computer-readable data storage medium of claim 9, wherein computing the calibration parameter model is in response to receiving the first training image.

14. The non-transitory computer-readable data storage medium of claim 9, wherein computing the calibration parameter model is according to a preset schedule.

15. The non-transitory computer-readable data storage medium of claim 9, wherein the computer-executable instructions further comprises:
instructions for adjusting a test image based on a current version of the calibration parameter model to determine whether the calibration parameter model has improved in accuracy over a previous version of the calibration parameter; and
wherein providing the calibration parameter model for the image processor is in response to determining that the current version has improved in accuracy.

16. A computer system, comprising:
a non-transitory memory device configured to store executable instructions;
a processor configured by the executable instructions to:
receive, from a mobile device, a first training image taken by a camera module of the mobile device and an image-context attribute describing a context associated with the first training image, wherein the image-context attribute is separate from the first training image;
add the first training image into a sub-group of training images in accordance with a similarity based, at least in part, on the image-context attribute;
in response to determining that a training set of images including the sub-group provides a threshold amount of data samples to compute a calibration parameter model, compute the calibration parameter model based, at least in part, on the sub-group of training images utilizing dimension reduction statistical analysis, wherein the calibration parameter model configures at least an image adjustment process corresponding to the image-context attribute and wherein the image adjustment process is configured to define how to post-process a raw photograph after being captured by the camera module; and cause an image processor to calibrate the raw photograph of the camera module by providing the calibration parameter model to the image processor.

\* \* \* \* \*